United States Patent
Nakayama et al.

(10) Patent No.: US 12,141,949 B2
(45) Date of Patent: Nov. 12, 2024

(54) VEHICLE-MOUNTED CAMERA APPARATUS AND IMAGE DISTORTION CORRECTION METHOD

(71) Applicant: SONY SEMICONDUCTOR SOLUTIONS CORPORATION, Kanagawa (JP)

(72) Inventors: Satoshi Nakayama, Kanagawa (JP); Yoshikazu Ohnami, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 88 days.

(21) Appl. No.: 17/593,114

(22) PCT Filed: Mar. 11, 2020

(86) PCT No.: PCT/JP2020/010611
§ 371 (c)(1),
(2) Date: Sep. 9, 2021

(87) PCT Pub. No.: WO2020/195851
PCT Pub. Date: Oct. 1, 2020

(65) Prior Publication Data
US 2022/0148138 A1    May 12, 2022

(30) Foreign Application Priority Data
Mar. 26, 2019   (JP) .................. 2019-058162

(51) Int. Cl.
*H04N 23/55* (2023.01)
*B60R 11/04* (2006.01)
(Continued)

(52) U.S. Cl.
CPC ............... *G06T 5/80* (2024.01); *B60R 11/04* (2013.01); *H04N 23/51* (2023.01); *H04N 23/55* (2023.01); *H04N 23/815* (2023.01)

(58) Field of Classification Search
CPC ...... G06T 5/006; H04N 23/51; H04N 23/815; H04N 23/55; B60R 11/04
See application file for complete search history.

(56) References Cited

U.S. PATENT DOCUMENTS

2005/0057651 A1 *  3/2005  Imoto ............... B60R 1/006
                                              348/148
2008/0278581 A1 * 11/2008  Inoue ............... B60R 11/04
                                              348/E5.025
(Continued)

FOREIGN PATENT DOCUMENTS

CN        103426160 A    12/2013
CN        103523014 A     1/2014
(Continued)

OTHER PUBLICATIONS

International Search Report and Written Opinion of PCT Application No. PCT/JP2020/010611, issued on Jun. 2, 2020, 12 pages of ISRWO.

*Primary Examiner* — Patrick E Demosky
(74) *Attorney, Agent, or Firm* — CHIP LAW GROUP

(57) ABSTRACT

An vehicle-mounted camera apparatus is an vehicle-mounted camera apparatus capable of imaging at least one of a front, a rear, and a side of a vehicle, and includes a lens, an image capture device unit that converts light imaged by the lens into an electrical signal to generate a captured image, and a light shielding unit that shields a light ray corresponding to a part of an image capture region of the image capture device unit on an incident surface side of the lens.

9 Claims, 20 Drawing Sheets

(51) Int. Cl.
  *G06T 5/80* (2024.01)
  *H04N 23/51* (2023.01)
  *H04N 23/80* (2023.01)

(56) References Cited

U.S. PATENT DOCUMENTS

| | | |
|---|---|---|
| 2010/0259648 A1 | 10/2010 | Iijima |
| 2012/0265416 A1* | 10/2012 | Lu ................... B62D 15/0295 348/148 |
| 2014/0009615 A1* | 1/2014 | Kiyohara ............ G06V 20/588 348/148 |
| 2014/0009616 A1 | 1/2014 | Nakamura et al. |
| 2017/0057500 A1 | 3/2017 | Lu |
| 2018/0186342 A1* | 7/2018 | Kubota ................... B08B 5/02 |
| 2018/0220081 A1* | 8/2018 | Lewis ...................... G06T 7/13 |

FOREIGN PATENT DOCUMENTS

| | | |
|---|---|---|
| CN | 103533231 A | 1/2014 |
| EP | 2682315 A1 | 1/2014 |
| EP | 2682896 A2 | 1/2014 |
| JP | 2002135765 A | 5/2002 |
| JP | 2005-145428 A | 6/2005 |
| JP | 2009267603 A | 11/2009 |
| JP | 2010003014 A | 1/2010 |
| JP | 2010026994 A | 2/2010 |
| JP | 2011-246056 A | 12/2011 |
| JP | 2012085026 A | 4/2012 |
| JP | 2013-009211 A | 1/2013 |
| JP | 2013-230815 A | 11/2013 |
| JP | 2014-011785 A | 1/2014 |
| JP | 2014-013449 A | 1/2014 |
| JP | 2017175206 A | 9/2017 |
| WO | 2006/114962 A1 | 11/2006 |
| WO | WO-2016185522 A1 | 11/2016 |

* cited by examiner

VEHICLE-MOUNTED CAMERA APPARATUS AND IMAGE DISTORTION CORRECTION METHOD

CROSS REFERENCE TO RELATED APPLICATIONS

This application is a U.S. National Phase of International Patent Application No. PCT/JP2020/010611 filed on Mar. 11, 2020, which claims priority benefit of Japanese Patent Application No. JP 2019-058162 filed in the Japan Patent Office on Mar. 26, 2019. Each of the above-referenced applications is hereby incorporated herein by reference in its entirety.

TECHNICAL FIELD

The present technology relates to a vehicle-mounted camera apparatus and an image distortion correction method thereof that can be attached to the vehicle.

BACKGROUND ART

Recently, a vehicle-mounted camera apparatus is widely used for a system for capturing an image by a camera using a wide-angle lens of a periphery of the vehicle to display a surrounding image on a monitor and notify an approaching object, a system for displaying a video of a rear of the vehicle in a room mirror monitor (smart room mirror), or the like.

The vehicle-mounted camera apparatus generally has a problem that flare, ghost, and halation generated in the image by sunlight incident on a camera lens should be suppressed. Therefore, a measure is taken to shield a light ray such as sunlight by placing a light shielding unit (hood) on an input surface side of the lens. For example, Patent Literatures 1 and 2 disclose a structure in which an incident angle of the light ray to the camera lens is limited by a hood.

CITATION LIST

Patent Literature

Patent Literature 1: Japanese Patent Application Laid-open No. 2013-230815
Patent Literature 2: Japanese Patent Application Laid-open No. 2013-009211

DISCLOSURE OF INVENTION

Technical Problem

Generally, the wide-angle lens is often used to capture an image of the periphery of the vehicle, but its angle of view is wider than an angle of view required to capture an image of the rear of the vehicle for the smart room mirror. Therefore, for example, in order to monitor the periphery of the vehicle, while capturing the image by the camera using the wide-angle lens, by cutting out an image for the smart room mirror from the captured image, a single camera can be used for two applications, i.e., for the monitoring of the periphery of the vehicle and for the smart room mirror. In this case, since the image for the smart room mirror generally requires a high resolution feeling, considering an effect of aberration or the like, it is desirable to bring an optical axis of the camera lens closer to a place to be displayed for the smart room mirror, and a depression angle of the camera is necessary to be small. On the other hand, if the depression angle of the camera is small, an upper side is captured wider than a horizontal line and sunlight and light of street lamps are easily incident on the camera lens, but the upper side above the angle of view used for the smart room mirror upper is essentially unnecessary to be captured.

In view of the above circumstances, an object of the present technology is to provide an vehicle-mounted camera apparatus and an image distortion correction method capable of generating a captured image with a higher quality by limiting an incident angle of a light ray to a camera lens by a hood.

Solution to Problem

In order to achieve the above object, an vehicle-mounted camera apparatus according to an embodiment of the present technology is an vehicle-mounted camera apparatus capable of imaging at least one of a front, a rear, and a side of a vehicle, and includes a lens; an image capture device unit that converts light captured by the lens into an electrical signal to generate a captured image; and a light shielding unit that shields a light ray corresponding to a part of an image capture region of the image capture device unit on an incident surface side of the lens.

In the vehicle-mounted camera apparatus according to the present technology, since the light shielding unit shields the light ray corresponding to a part of the image capture region of the image capture device unit on the incident surface side of the lens, it is possible to prevent the light of the light source such as the sun or the street lamp from entering the lens and to prevent flares, ghosts, halation, and the like from generating.

According to the present technology, by arranging the light shielding unit along the surface of the lens, it is possible to minimize the amount of external protrusion.

According to the present technology, an image processing unit that generates a first output image having a first resolution and a second output image having a second resolution smaller than that of the first output image from the captured image generated by the image capture device is further included, and a region where the light ray is shielded by the light shielding unit is outside the region of the second output image.

Thus, the second output image is not hidden by the light shielding unit.

The lens can be a wide-angle lens, or a wide-angle lens having high characteristics in which an image near an optical axis center is enlarged.

The image processing unit may calculate the image height characteristics of the wide-angle lens based on edge information included in the image of the light shielding unit.

The image processing unit may correct distortion of the captured image based on the calculated image height characteristics of the wide-angle lens and a design value of the image height characteristics.

Thus, a good captured image obtained by correcting the distortion of the captured image along with a change in the image height characteristics is obtained.

The image processing unit may acquire temperature data, calculate the image height characteristics of the wide-angle lens when a difference between the temperature at the time of previous distortion correction is equal to or higher than a predetermined value, and correct the distortion of the captured image based on the calculated image height characteristics of the wide-angle lens and the design value of the image height characteristics, when the difference between the image height characteristics at the time of the previous distortion correction is equal to or higher than a threshold value.

Thus, to evaluate the image height characteristics of the wide-angle lens using the change in temperature as a trigger, if necessary, it is possible to correct the distortion of the captured image.

The vehicle-mounted camera apparatus according to the present technology may further include an image output unit that outputs the first output image and the second output image generated by the image processing unit to one or more monitors.

The light shielding unit may have a water droplet receiver. Thus, water droplets are hardly attached to the incident surface of the lens during running in rainy weather, in addition to being able to ensure visibility of an image output to a room mirror monitor and to maintain a calculation accuracy of the image height characteristics.

The vehicle-mounted camera apparatus according to the present technology may further include a camera housing for mounting the lens and the image capture device unit, and the light shielding unit may be provided on the camera housing.

Alternatively, the vehicle-mounted camera apparatus according to the present technology may further include a camera housing for mounting the lens and the image capture device unit; and a bracket for fixing the camera housing to the vehicle, and the light shielding unit may be provided on the bracket.

Furthermore, in order to achieve the above object, an image distortion correction method of the vehicle-mounted camera apparatus according to another embodiment of the present technology, including:

capturing an image via a light shielding unit that shields a light ray corresponding to a part of an image capture region of an image capture device unit at an incident surface side of a lens, calculating image height characteristics of the lens from the captured image, and correcting distortion of the captured image based on the calculated image height characteristics of the lens a design value of the image height characteristics.

Advantageous Effects of Invention

As described above, according to the present technology, it is possible to generate a captured image of higher quality.

MODE(S) FOR CARRYING OUT THE INVENTION

Embodiments according to the present technology will now be described below with reference to the drawings.

First Embodiment

[Configuration of Vehicle-Mounted Camera Apparatus]

Figure 1:
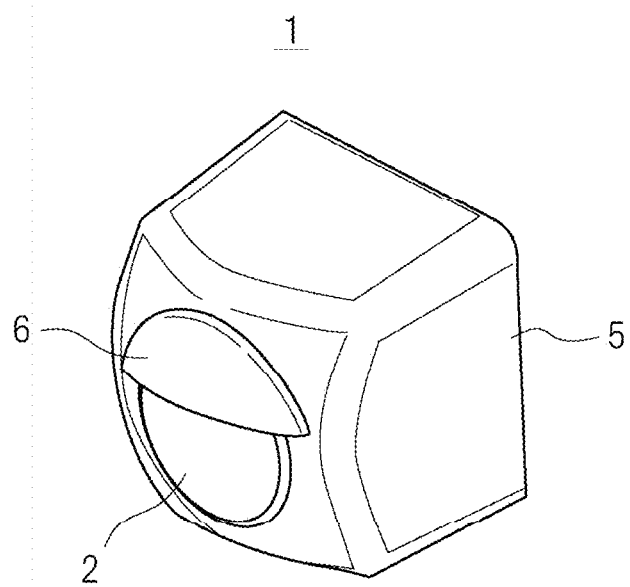
FIG. 1 is a perspective view of an vehicle-mounted camera apparatus 1 according to a first embodiment of the present technology.
Figure 2:
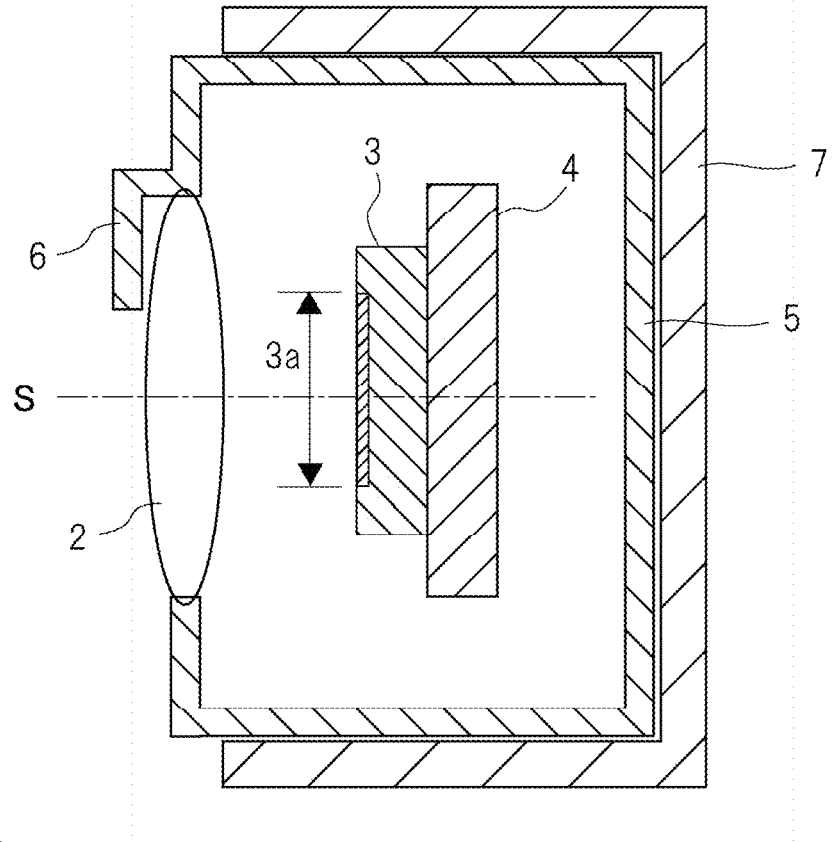
FIG. 2 is a cross-sectional view of the vehicle-mounted camera apparatus 1 of FIG. 1.

FIG. 1 is a perspective view of a vehicle-mounted camera apparatus 1 of a first embodiment according to the present technology, and FIG. 2 is a cross-sectional view of the vehicle-mounted camera apparatus 1 of FIG. 1.

The vehicle-mounted camera apparatus 1 includes a lens 2, an image capture device 3, a substrate 4, a camera housing 5, a light shielding unit 6, and a bracket 7.

In the perspective view of FIG. 1, the bracket 7 is not shown.

The lens 2 is an optical component or a lens group for imaging light on an imaging surface of the image capture device 3.

The image capture device 3 converts the light imaged by the lens 2 into an electrical signal. The image capture device 3 is constituted, for example, by a CMOS (Complementary Metal Oxide Semiconductor) sensor, a CCD image sensor, or the like.

The substrate 4 is a substrate 4 on which the image capture device 3 is mounted on one surface. A video signal processing circuit for generating an image from the electrical signal generated by the image capture device 3 is mounted on the substrate 4 or other substrate (not shown).

The image capture device 3 and the substrate 4 correspond to an "image capture device unit" in the claims.

The camera housing 5 is a housing for accommodating the substrate 4 mounted with the lens 2 and the image capture device 3. The camera housing 5 is attached to a vehicle body via the bracket 7 which is fixed to the vehicle body (not shown).

The light shielding unit 6 is for shielding a light ray corresponding to a part of an image capture region 3a of the image capture device 3 at an incident surface side of the lens 2. The center of the image capture region 3a of the image capture device 3 may not necessarily coincide with an optical axis position of the lens 2.

[Characteristics of Lens 2]

A wide-angle lens or the like may be used as the lens 2.

Figure 3:
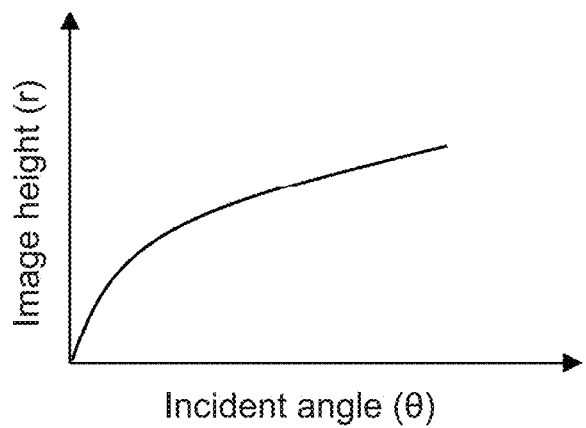
FIG. 3 is a graph showing an example of image height characteristics of a wide-angle lens 2.
Figure 4:
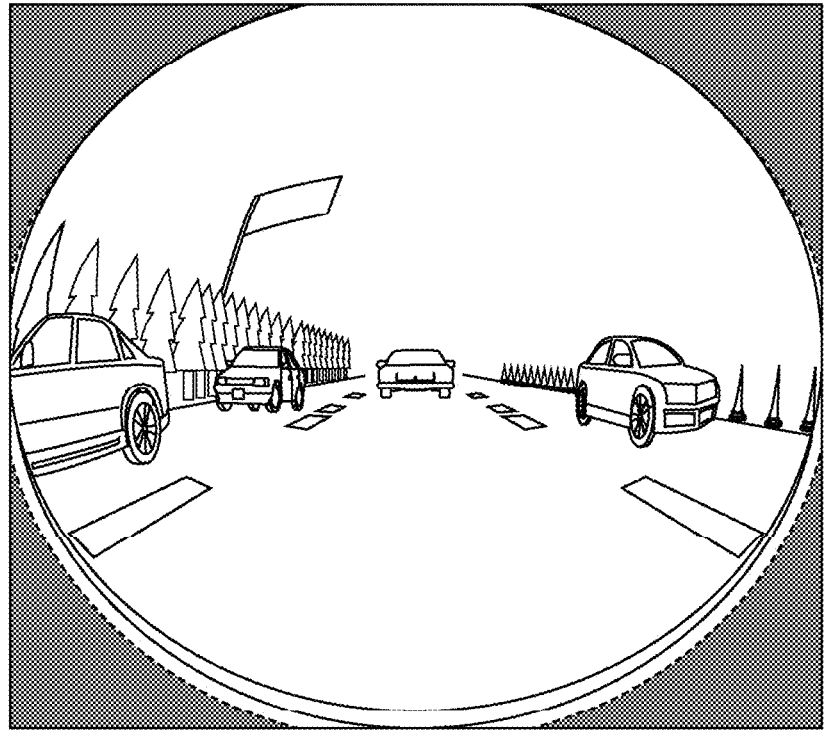
FIG. 4 is a view showing an example of an image captured using the wide-angle lens 2 of FIG. 3.
Figure 5:
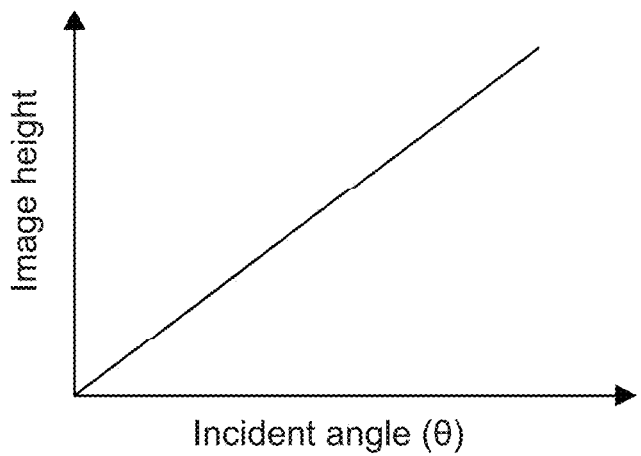
FIG. 5 is a graph showing linear image height characteristics.
Figure 6:
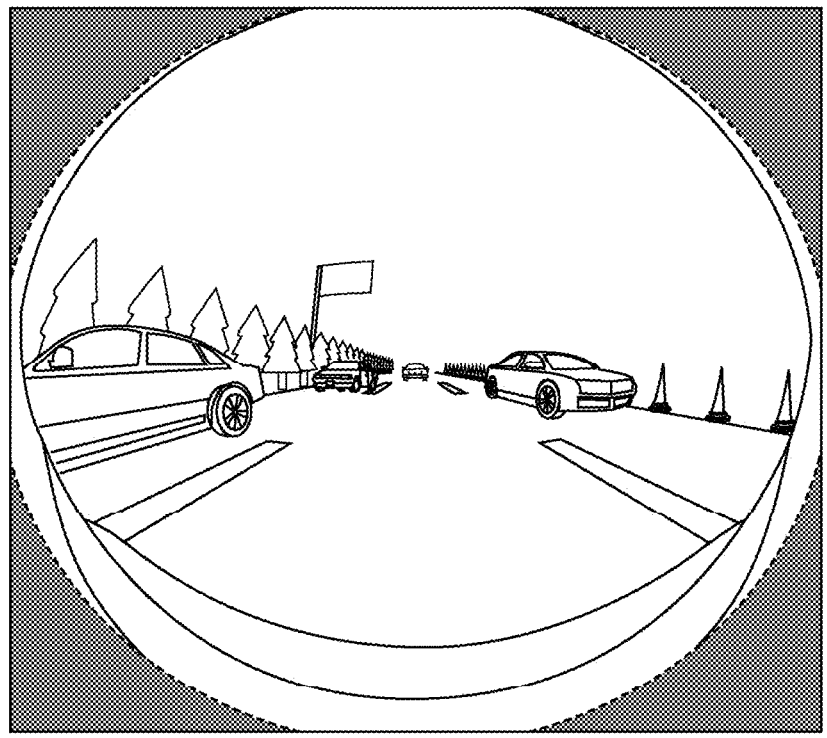
FIG. 6 is a view showing an example of an image captured using a lens having the linear image height characteristics.

In order to improve a resolution feeling of the image cut out for a smart room mirror as much as possible, a lens having image height characteristics in which an image near the center is enlarged can be adopted to the wide-angle lens 2. FIG. 3 shows an example of the image height characteristics of the wide-angle lens 2. FIG. 4 is a view showing an example of an image captured using the wide-angle lens 2 having the image height characteristics near the center is enlarged as described above. For comparison, FIG. 6 is a view showing an example of an image captured using a wide-angle lens having linear image height characteristics as shown in FIG. 5. As can be seen by comparing the image of FIG. 4 and the image of FIG. 6, the image of subjects near the center (such as subsequent vehicles) of FIG. 6 captured using the wide-angle lens having the linear image height characteristics is smaller than the image of FIG. 4 captured using the wide-angle lens 2 having the image height characteristics of FIG. 3. Therefore, when the image for the smart room mirror is cut out from here, the resolution feeling is deteriorated.

[Camera Orientation]

As shown in FIG. 2, the vehicle-mounted camera apparatus 1 is installed such that an optical axis S of the lens 2 is oriented horizontally (in the X-axis direction) or substantially horizontally.

For this reason, flares, ghosts, halation, and the like may be generated due to light of a light source such as the sun or a street lamp incident on the lens 2 in a region above the middle of the captured image.

The vehicle-mounted camera apparatus 1 according to the present technology, in order to solve such problems, is configured to minimize the light of the light source such as the sun and the street lamp entering the lens 2 by providing the light shielding unit 6 for shielding the light ray corresponding to a part of the image capture region 3a of the image capture device 3 on the incident surface side of the lens 2.

Figure 7:
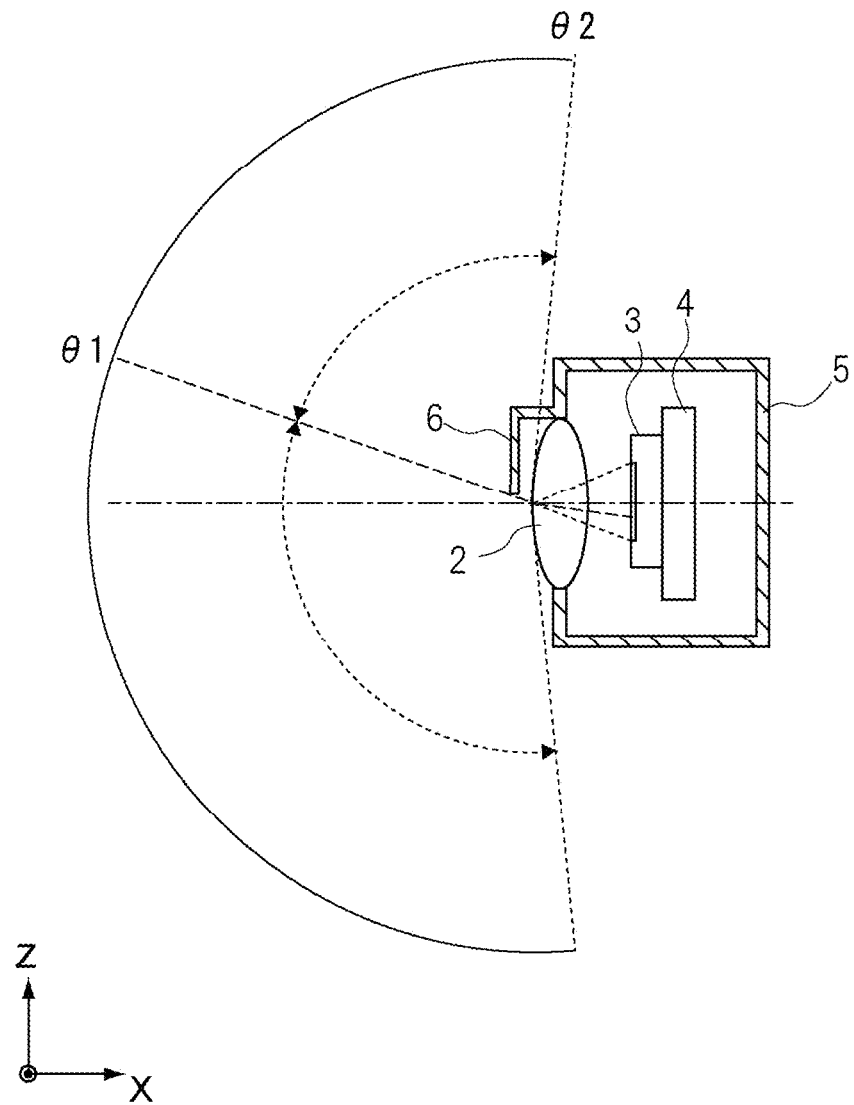
FIG. 7 is a view showing an angle at which an incident light ray on the lens 2 is shielded by a light shielding unit 6.
Figure 8:
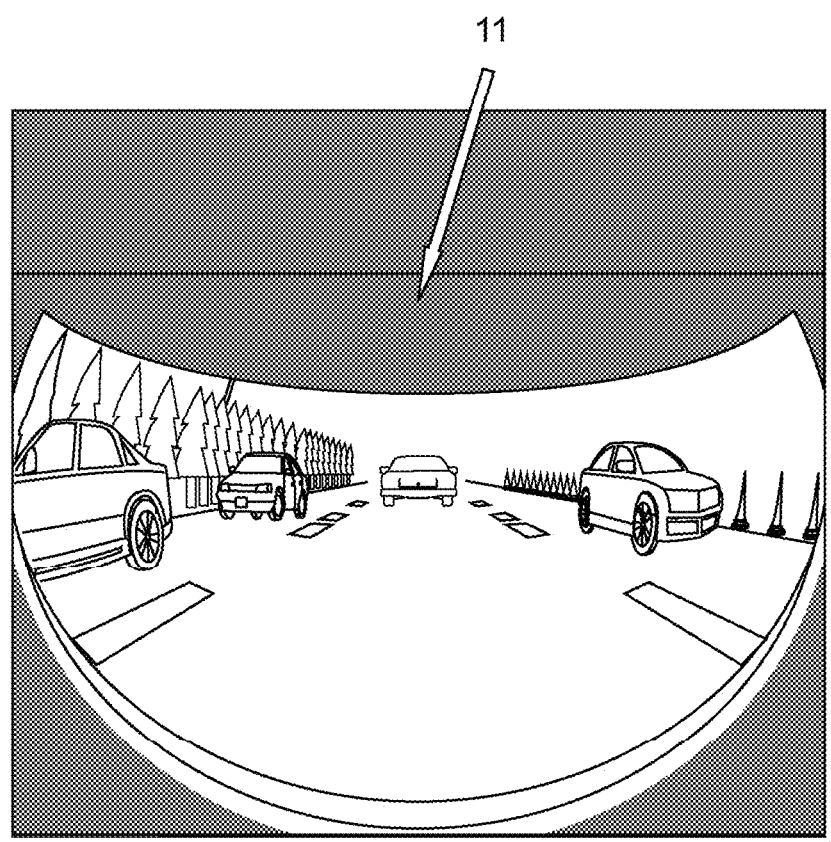
FIG. 8 is a view showing an example of an image captured as a result of the incident light ray is shielded by the light shielding unit 6.

FIG. 7 is a view showing an angle at which an incident light ray on the lens 2 is shielded by the light shielding unit 6, and FIG. 8 is a view showing an example of an image captured as a result of the incident light ray is shielded by the light shielding unit 6.

Thus, by shielding the incident light of the angular range of from θ1 to θ2 from diagonally upward corresponding to a partial region belonging to the image capture region 3a of the image capture device 3 with the light shielding unit 6, when the optical axis S of the lens 2 is directed in the horizontal direction or substantially horizontal direction, a low-brightness portion 11 is generated in a bias region above the captured image by the light shielding unit 6. That is, it is possible to prevent the light of the light source such as the sun or the street lamp from entering the lens 2 and to minimize the generation of flares, ghosts, halation, and the like.

Furthermore, in a condition where the optical axis S of the lens 2 is directed in the horizontal direction or substantially horizontal direction, the light shielding unit 6 does not hide the image of a road surface or an object on the road surface. Thus, it does not affect a quality of a smart room mirror image, which is cut out mainly from a middle height region of the captured image, or it does not affect an image analysis for a distance measurement with adjacent vehicles or obstacle.

[Specific Example of Light-Shielding Unit 6]

Next, a specific example of the light shielding unit 6 will be described.

Figure 9:
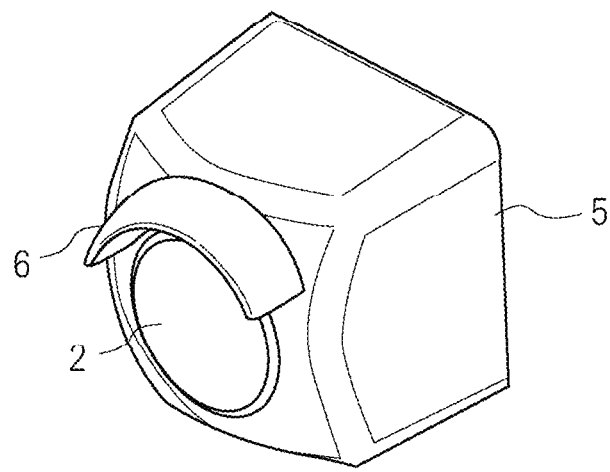
FIG. 9 is a perspective view showing a specific example of the light shielding unit 6.
Figure 10:
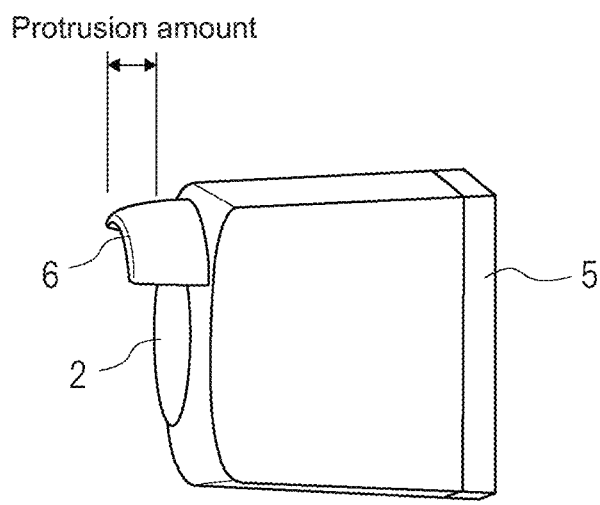
FIG. 10 is a side view of the specific example of the light shielding unit 6 of FIG. 9.

FIG. 9 is a perspective view showing a specific example of the light shielding unit 6, and FIG. 10 is a side view thereof.

Thus, the light shielding unit 6 may be provided so as to protrude in the direction of the optical axis S of the lens 2.

Figure 11:
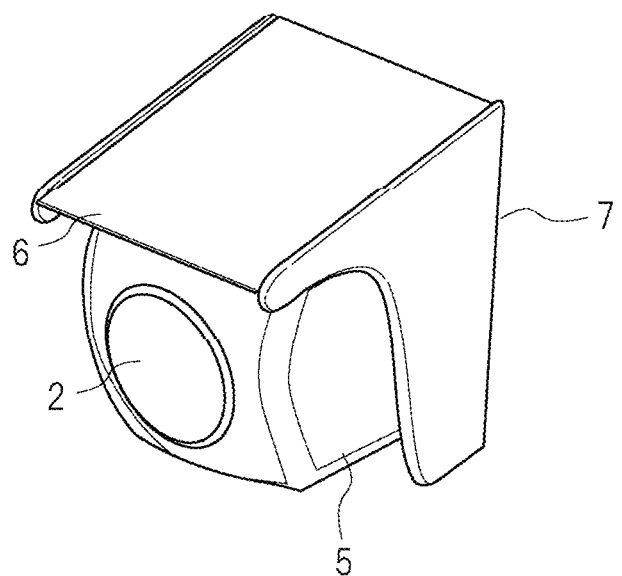
FIG. 11 is a perspective view of the vehicle-mounted camera apparatus 1 with the light shielding unit 6 on a bracket 7.
Figure 12:
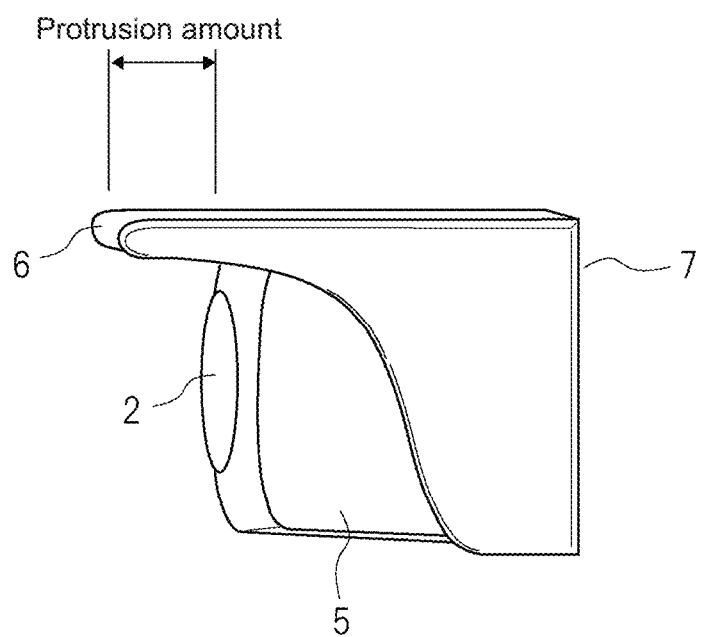
FIG. 12 is a side view of the vehicle-mounted camera apparatus 1 of FIG. 11.

In addition, the light shielding unit 6 may be provided on the bracket 7. FIG. 11 is a perspective view of the vehicle-mounted camera apparatus 1 in which the light-shielding unit 6 is provided on the bracket 7, and FIG. 12 is a side view thereof.

However, when the light shielding unit 6 protrudes in the direction of the optical axis S of the lens 2 as described above, there is a possibility that does not conform to the standard relating to an external protrusion of a passenger car.

Figure 13:
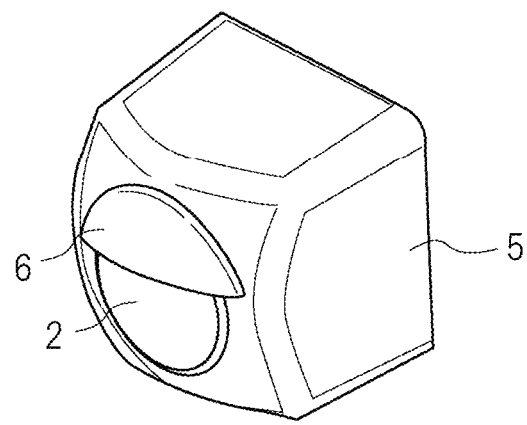
FIG. 13 is a perspective view showing the vehicle-mounted camera apparatus 1 having the light shielding unit 6 provided along an incident surface of the lens 2.
Figure 14:
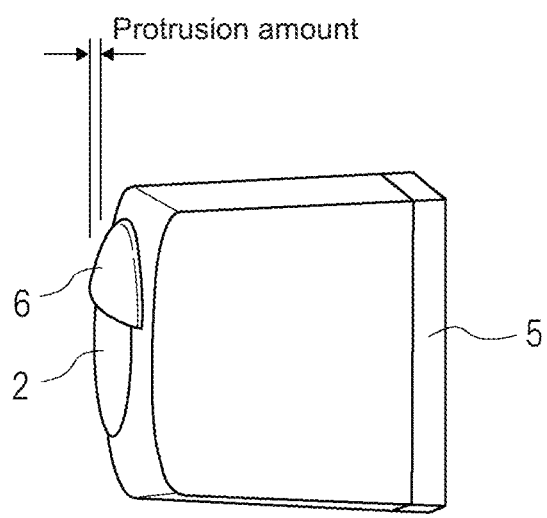
FIG. 14 is a side view of the vehicle-mounted camera apparatus 1 of FIG. 13.
Figure 15:
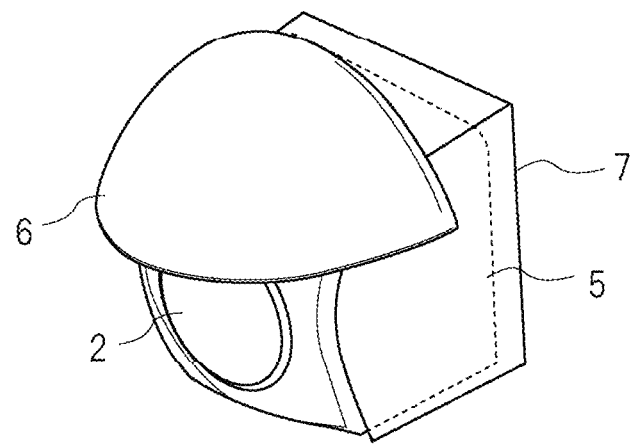
FIG. 15 is a perspective view of the vehicle-mounted camera apparatus 1 provided with the light shielding unit 6 on the bracket 7.
Figure 16:
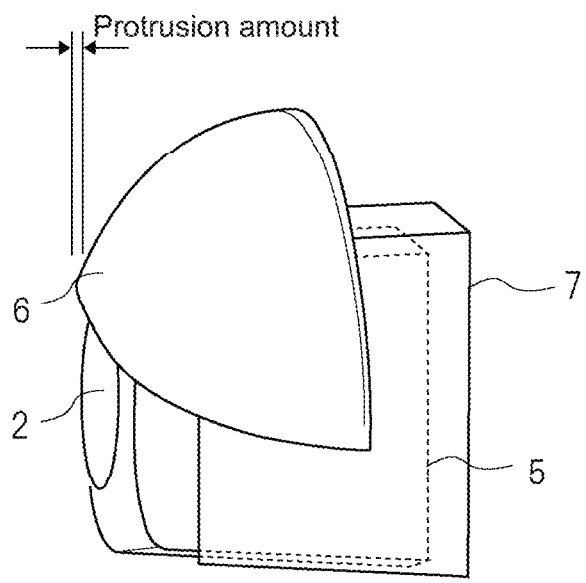
FIG. 16 is a side view of the vehicle-mounted camera apparatus 1 of FIG. 15.

To minimize a protrusion amount of the light shielding unit 6, as shown in FIGS. 13 and 14, the light shielding unit 6 is more desirably provided along the incident surface of the lens 2. Thus, the protrusion amount of the light shielding unit 6 can be suppressed to about the thickness of the light shielding unit 6, and it is easy to conform to the standard relating to an external projection of the passenger car. Furthermore, as shown in FIG. 15 and FIG. 16, even when the light shielding unit 6 is provided on the bracket 7, it is possible to provide the light shielding unit 6 so as to cover the incident surface of the lens 2.

An attaching angle of the vehicle-mounted camera apparatus 1 is not necessarily constant and may vary depending on the vehicle type or the like, for example. When the attaching angle of the vehicle-mounted camera apparatus 1 is changed, the angular range of the incident light ray shielded by the light shielding unit 6 is also changed, in the worst case, it may appear the low-brightness portion by the light shielding unit 6 in the smart room mirror image, or it may appear the low-brightness portion in a region that influences the image analysis for the distance measurement with the adjacent vehicles or the obstacles. Therefore, it is possible to cope with the above problems by preparing a plurality types of brackets 7 having different shielding conditions of the light shielding unit 6 (angular ranges of incident light ray shielded by light shielding unit).

Figure 27:
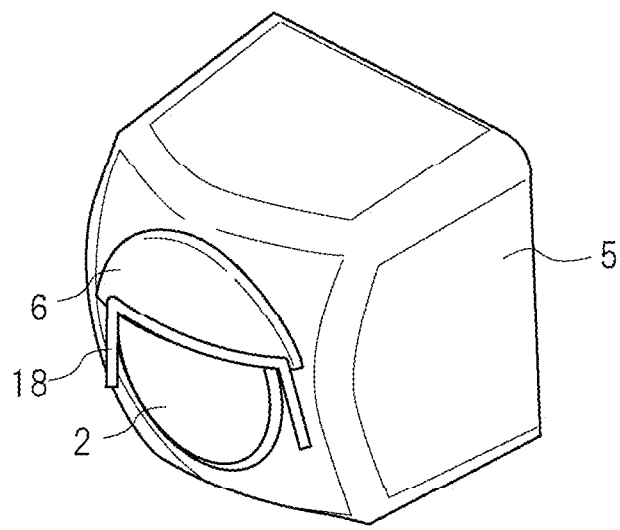
FIG. 27 is a perspective view of the vehicle-mounted camera apparatus 1 having a water droplet receiver 18 on the light shielding unit 6.

Furthermore, as shown in FIG. 27, in order to hardly attach water droplets to the incident surface of the lens 2 during running in rainy weather, a water droplet receiver 18 for receiving water droplets from above and escaping water droplets to both sides of the lens 2 may be provided at a lower end and both sides of the light shielding unit 6.

(Processing Block of Vehicle-Mounted Camera Apparatus 1)

Next, a configuration of an image processing system of the vehicle-mounted camera apparatus 1 will be described.

Figure 17:
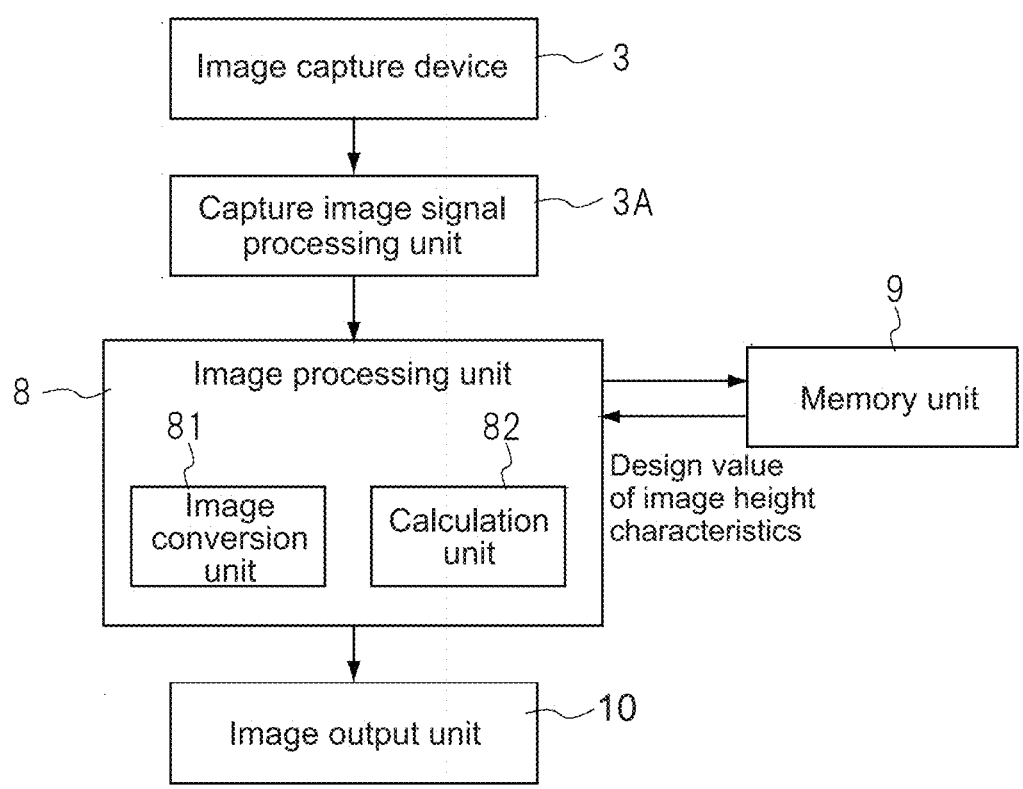
FIG. 17 is a block diagram showing a configuration of an image processing system of the vehicle-mounted camera apparatus 1.

FIG. 17 is a block diagram showing a configuration of the image processing system of the vehicle-mounted camera apparatus 1.

As shown in the FIG. 17, the vehicle-mounted camera apparatus 1 further includes an image processing unit 8, a memory unit 9, and an image output unit 10.

The electrical signal converted from the light by the image capture device 3 is a frame-by-frame or field-by-field video signal by a capture image signal processing unit 3A, and is supplied to the image processing unit 8.

The image processing unit 8 includes an image conversion unit 81 and a calculation unit 82.

The calculation unit 82 performs analysis of the captured image. The calculation unit 82 detects, for example, positions of the feature points appeared at or around a low-luminance video portion by the light shielding unit 6 in the captured image, and calculates a difference from a design position of each feature point stored in the memory unit 9 as a change amount of the image height characteristics of the lens. The calculation unit 82 generates the parameter and the like necessary to cancel adverse effects due to a change in the image height characteristics of the lens such as, for example, generation of a parameter for correction of distortion of the captured image along with the change in the image height characteristics of the lens and correction of a parameter for measurement of the distance from the object on the road surface based on the calculated change amount of the image height characteristics of the lens.

The image conversion unit 81 performs the correction of the distortion of the captured image based on the parameter for the correction of distortion obtained by the calculation unit 82, or generation of a viewpoint converted image such as a top-down view image from the distortion corrected captured image, for example, the generation of the smart room mirror image.

The image output unit 10 outputs the top-down view image obtained by the image conversion unit 81 to a monitor for top-down view. Furthermore, the image output unit 10 outputs the smart room mirror image obtained by the image conversion unit 81 to a monitor of the smart room mirror.

The memory unit 9 stores calculated image height characteristic data, image height characteristic data on setting, and the like.

(Image Distortion Correction Along with Change in Image Height Characteristics of Lens)

In general, it is known that the image height characteristics of the lens are changed due to an influence of temperature or the like. Therefore, the vehicle-mounted camera apparatus 1 of the present embodiment is configured to detect the image height characteristics of the lens by calculating the image height for each feature point included in the captured image, generates the parameter for the correction of the distortion of the image along with the change in the image height characteristics of the lens from a difference and a ratio from a design height for each feature point, and performs the correction of the distortion of the image along with the change in the image height characteristics of the lens.

So as to quantitatively detect the change in the image height characteristics of the lens 2, in the above-described light shielding unit 6, notches or the like are formed such that a plurality of feature points appears in the low-brightness portion 11 or the image therearound by the light shielding unit 6, their positions being moved in a captured image space along with the change in the image height characteristics of the lens 2.

Figure 18:
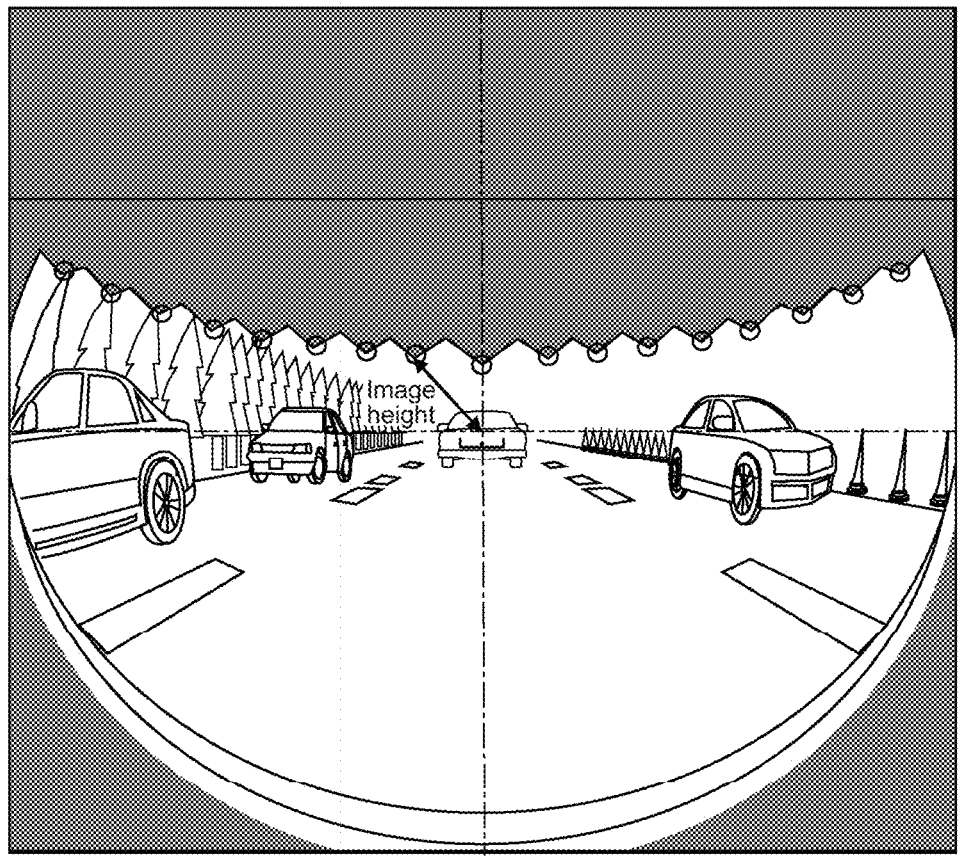
FIG. 18 is a view showing a captured image in a case where the light shielding unit 6 having an edge portion notched in a sawtooth shape.

FIG. 18 is a view showing a captured image when the light shielding unit 6 having an edge portion being notched in a sawtooth shape is used. In this case, the captured image is such that the low-brightness portion 11 formed by shielding the light ray by the light shielding unit 6 and the video portion where the light ray is not shielded are seen by separating in the sawtooth shape. In this case, for example, an outer corner vertex and/or an inner corner vertex of each tooth can be set as a feature point (indicated by a circle) and the position of each feature point in the captured image can be detected by edge information detection or the like. FIG. 18 shows a result of detecting the outer corner vertex of each tooth as the feature point.

Figure 19:
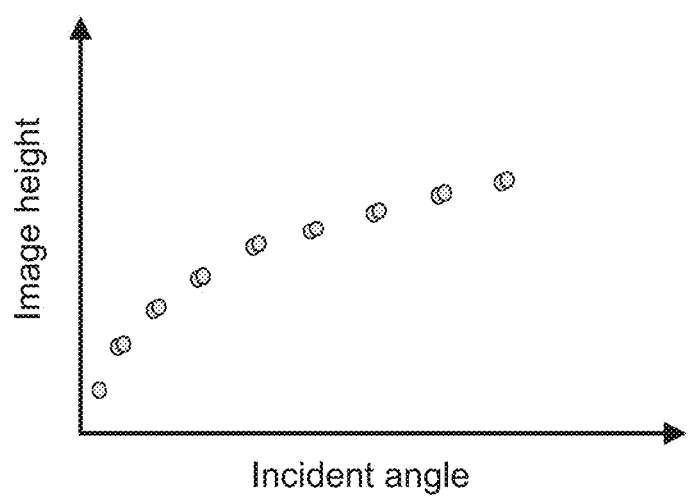
FIG. 19 a graph showing the image height characteristics calculated from the image of FIG. 18.

FIG. 19 is a graph showing a relationship between the image height characteristics obtained from the image of FIG. 18, that is, the image height for each feature point (distance between feature point and optical axis center) and the incident angle. The points are distributed in positions closely two by two because respective feature points of the image of FIG. 18 are arranged symmetrically. Since they are not completely symmetrical in practice, the graph supposes that the incident angle and the image height slightly deviate at the left and right feature points.

Figure 20:
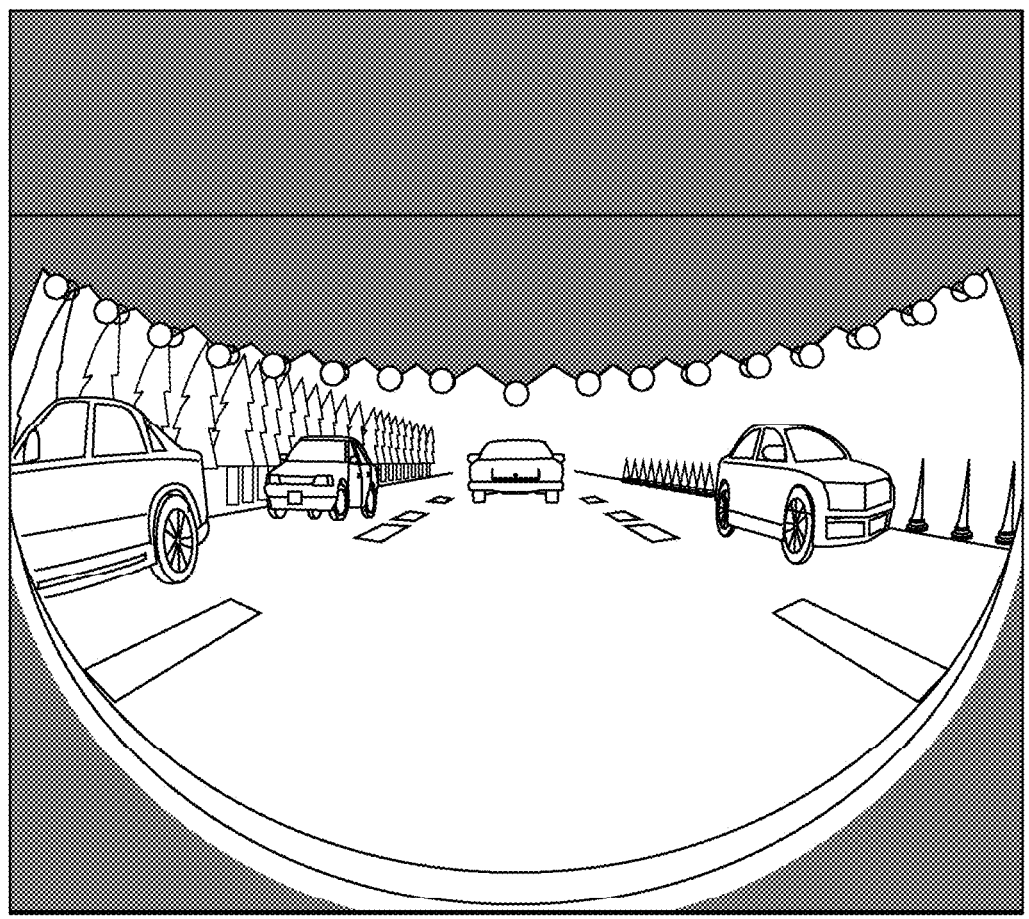
FIG. 20 is a view showing by comparing positions of respective feature points before and after a change in image height characteristics with a temperature change.

FIG. 20 is a view showing by comparing the positions of the respective feature points before and after the change in the image height characteristics with temperature change, white filled circle marks are the positions of respective feature points after the change in the image height characteristics, and unfilled circle marks are the positions of respective feature points before the change in the image height characteristics.

Figure 21:
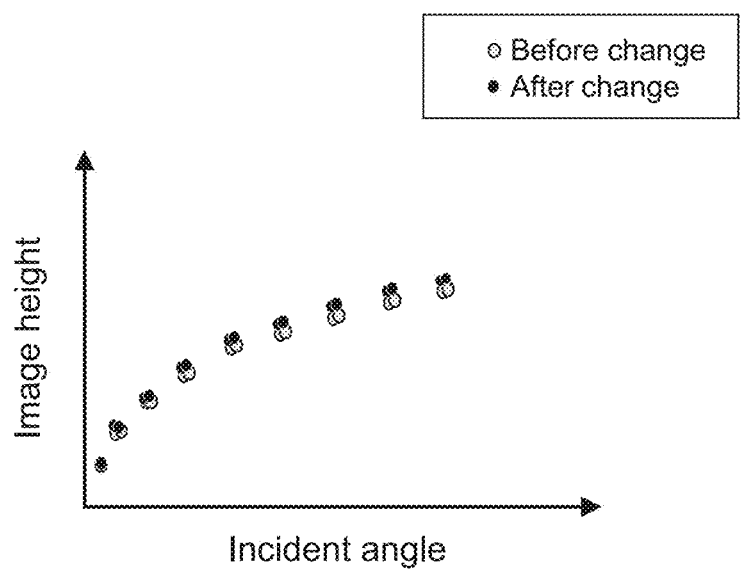
FIG. 21 is a graph showing the image height characteristics before and after the change with the temperature change.

Thus, the change in the image height characteristics of the lens with the temperature change appears as an overall change in the positions of respective feature points. FIG. 21 is a graph showing a relationship between the image height characteristics before and after the change with the temperature change, that is, the image height for each feature point before and after the change in the image height characteristics (distance between feature point and optical axis center) and the incident angle.

Hereafter, a description will be continued using the image height characteristics before the change as the image height characteristics in the design.

The calculation unit 82 of the image processing unit 8 calculates the difference between the image heights before and after the change for each feature point, and generates the parameter for the correction of the distortion of the image due to the change in the image height characteristics from the calculated difference.

Figure 26:
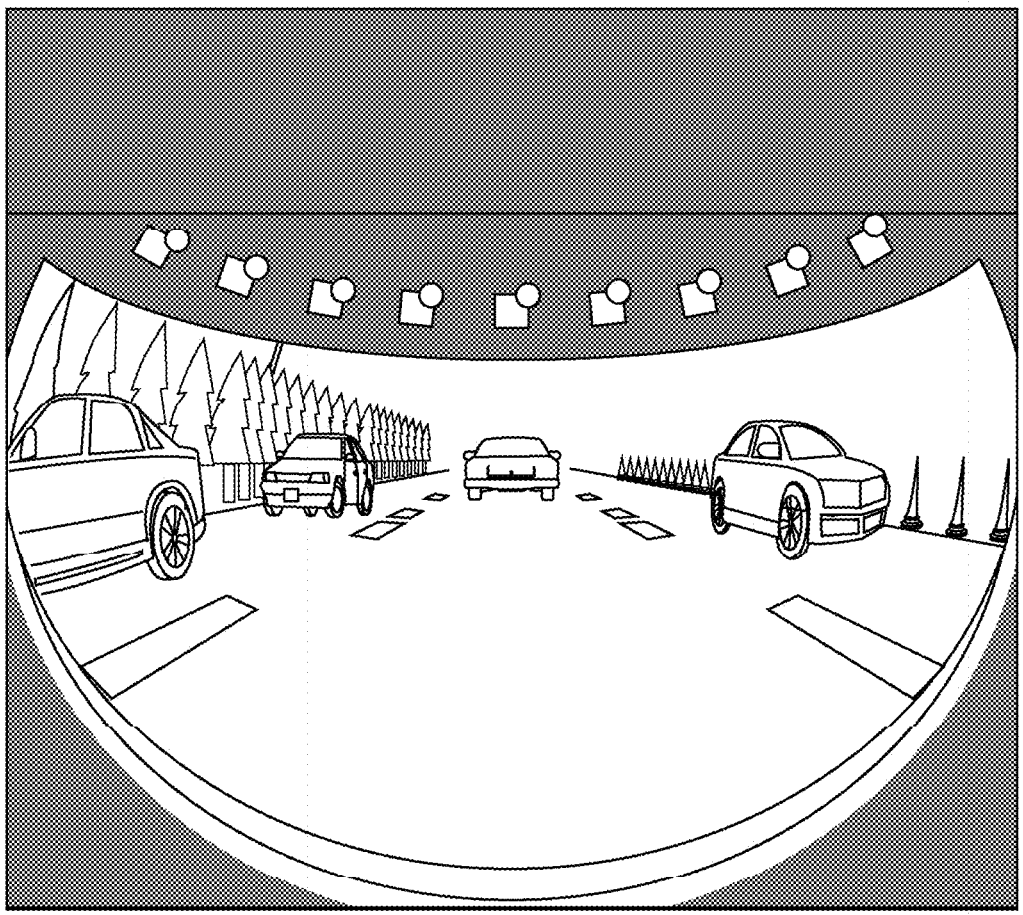
FIG. 26 is a view showing a captured image when the light shielding unit 6 having an opening for causing to appear the feature points in the captured image is used.

Incidentally, in order to appear the feature points in the captured image, the above example adopts the light shielding unit 6 having the edge portion which is notched in the sawtooth shape, but, for example, as shown in FIG. 26, the feature points may be caused to appear in the captured image by providing rectangular openings in the light shielding unit 6. In this case, among the four inner corner points in the rectangular opening, one inner corner point (e.g., upper right corner) or an opening center may be detected as the feature point.

Next, a method of generating the smart room mirror image by considering the change in the image height characteristics of the lens 2 from the captured image will be described with reference to FIG. 22.

Figure 22:
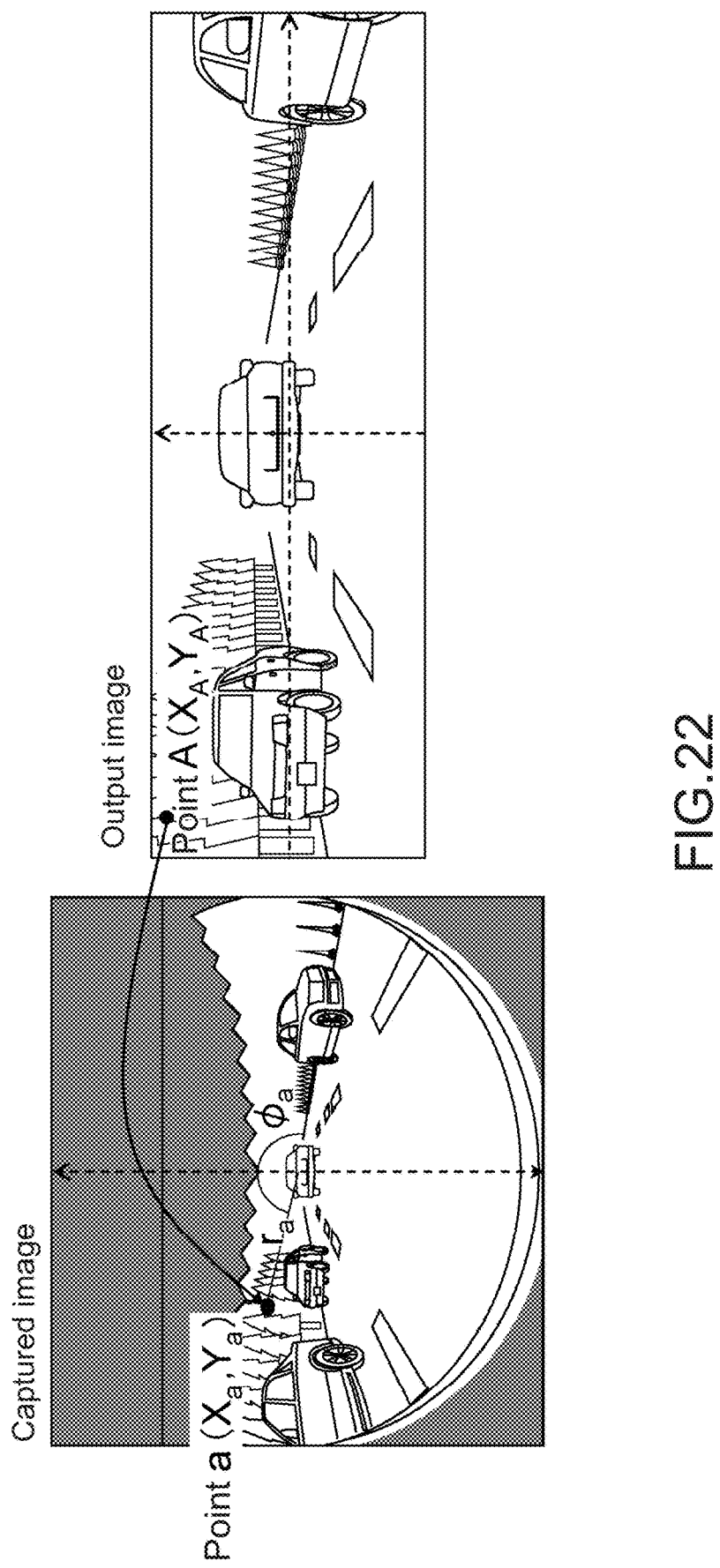
FIG. 22 is a view illustrating a method of generating a smart room mirror image by considering a change in the image height characteristics of the lens 2 from the captured image.

In the FIG. 22, the left image is the captured image (first output image having first resolution), and the right image is the smart room mirror image (second output image of second resolution) generated from the left captured image. Thus, the smart room mirror image has an aspect resolution corresponding to a shape of a monitor screen of the smart room mirror, and when the optical axis of the lens 2 is directed in the substantially horizontal direction is produced by using an image of an intermediate height region including the optical axis center from the captured image so as to include the entire of the subsequent vehicles. Incidentally, a height position of a lower end of a region taking the smart room mirror image from the captured image is a position of 8 degrees obliquely upward from the optical axis of the lens 2, for example, as viewed from the image capture device 3 of the vehicle-mounted camera apparatus 1.

Figure 23:
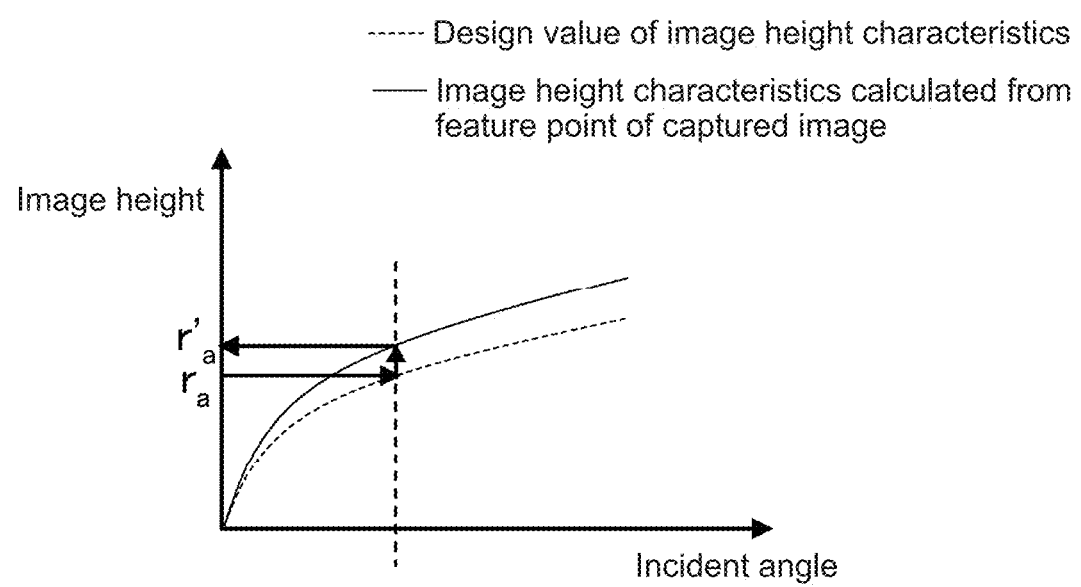
FIG. 23 is a graph showing a correlation between a design value of the image height characteristics and the image height characteristics detected from the captured image.

In the smart room mirror image of FIG. 22, the information displayed at the point A $(x_A, y_A)$ refers to the point a $(x_a, y_a)$ in the captured image if the image height characteristics of the lens 2 are not changed. Assuming that the point a $(x_a, y_a)$ in the captured image is a distance of $r_a$ from the optical axis center (image height) and is at an angular position of $\varphi_a$, the position of the point a is calculated by $(r_a \cos \varphi_a, r_a \sin \varphi_a)$. If the image height characteristics of the lens 2 are changed, the calculation unit 82, for example, as shown in FIG. 23, for each feature point, with respect to a design value of the image height characteristics, the difference or ratio from/to the image height characteristics detected from the captured image is generated. The arithmetic unit 82 calculates an appropriate distance $r_a'$ for each point a of the captured image using the above-described data, and calculates the position to be actually referred from the distance $r_a'$ and the angle $\varphi_a$. This results in the smart room mirror image with reduced distortion due to the change in the image height characteristics.

Figure 28:
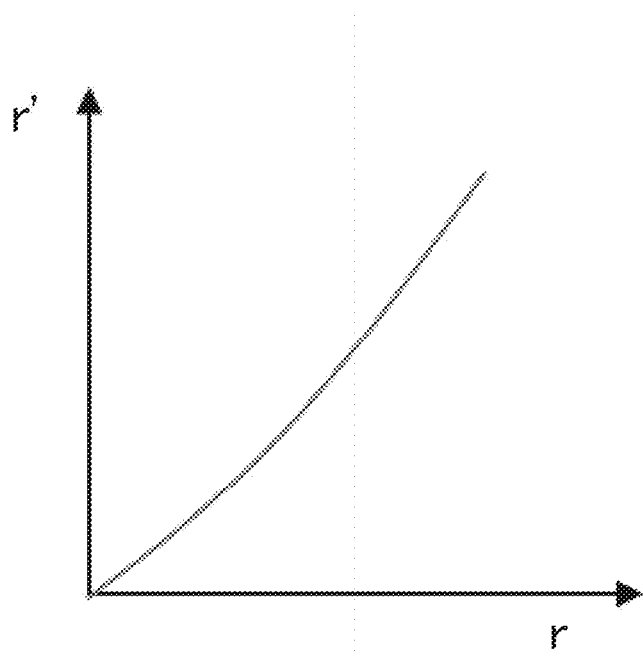
FIG. 28 is a graph showing a correlation between a design value r of the image height characteristics and an image height r' obtained by the image height characteristics detected from the captured image.

Furthermore, rather than a correlation such as the difference or the ratio between the design value of the image height characteristics and the image height characteristics detected from the captured image for each feature point, for example, as shown in FIG. 28, it is also possible to use a correlation between an image height value r and an image height r' obtained by the design value r of the image height characteristic and the image height characteristics detected from the captured image.

<Modification 1>

Next, Modification 1 according to the present technology will be described.

Figure 24:
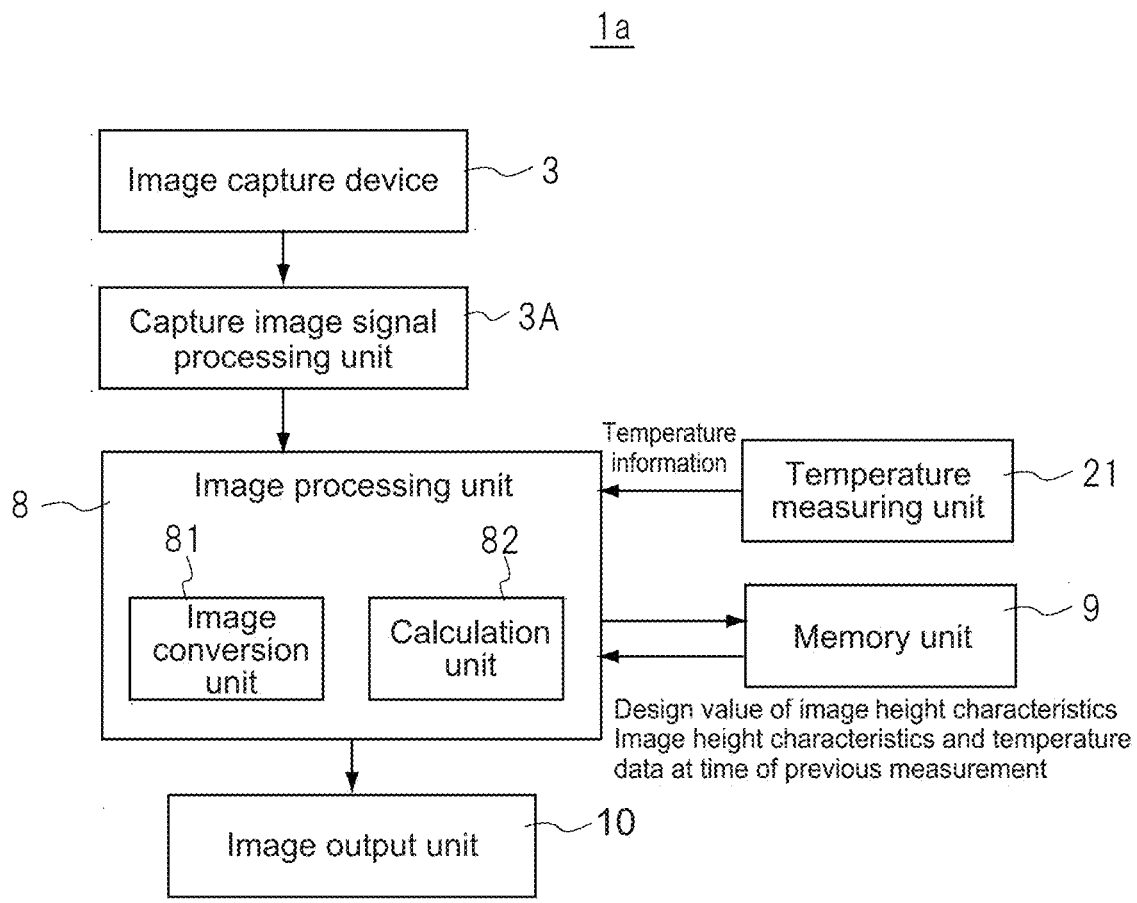
FIG. 24 is a block diagram of an vehicle-mounted camera apparatus 1a of Modification 1.

FIG. 24 is a block diagram of a vehicle-mounted camera apparatus 1a of Modification 1.

As shown in the FIG. 24, the vehicle-mounted camera apparatus 1a has a temperature measuring unit 21 for measuring a temperature. The temperature measuring unit 21 may be, for example, a thermometer for actually measuring an external environmental temperature of the vehicle and the temperature in the vicinity of the vehicle-mounted camera apparatus 1a. The vehicle-mounted camera apparatus 1a of Modification 1 is configured to evaluate the image height characteristics by a feature point position analysis as described above when the measured temperature is changed above a certain value.

Figure 25:
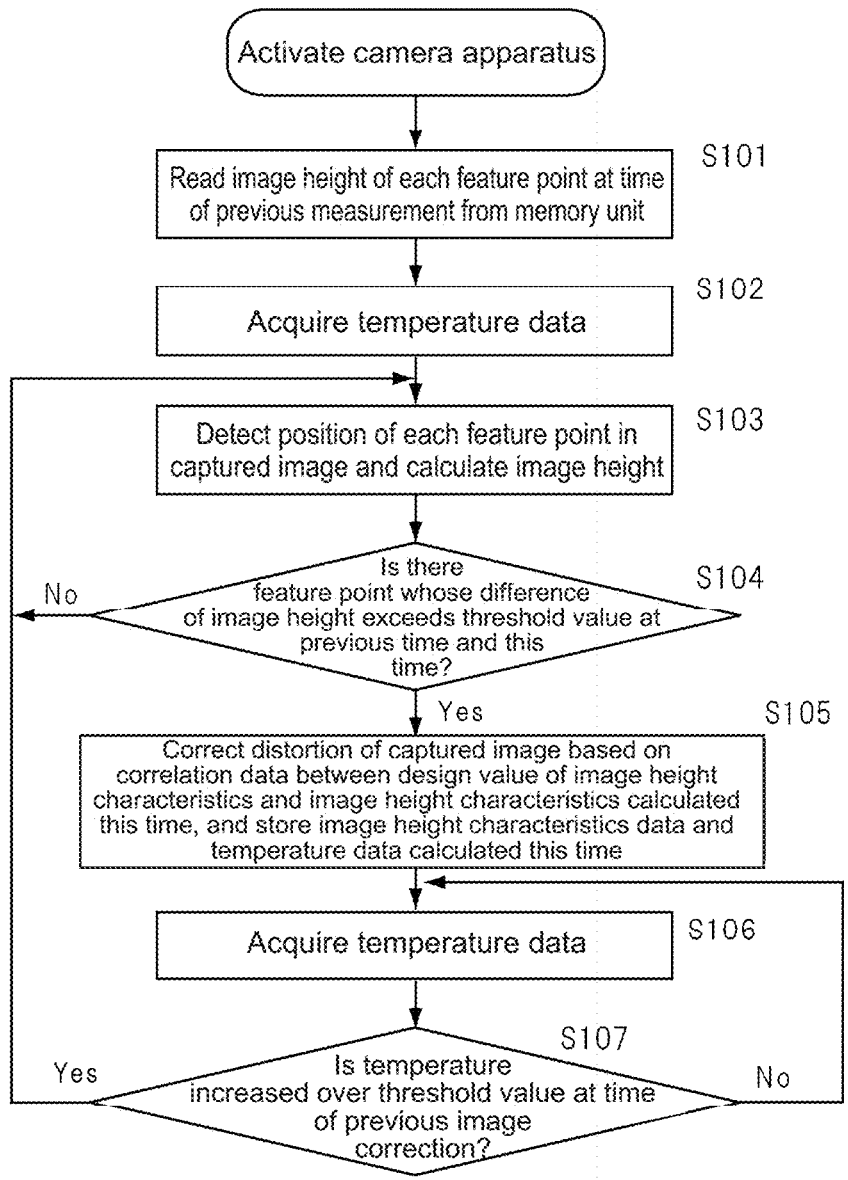
FIG. 25 is a flowchart relating to a control of an evaluation of the image height characteristics by a feature point position analysis described above when a measured temperature is changed above a certain value in the vehicle-mounted camera apparatus 1a of Modification 1.

FIG. 25 is a flowchart relating to a control of the evaluation of the image height characteristics by the feature point position analysis as described above when the measured temperature is changed by a constant value or more.

It is assumed that design image height data of each feature point, image height data of each feature point at the time of previous image correction, and the temperature data are stored in the memory unit 9.

When the vehicle-mounted camera apparatus 1a is activated, the calculation unit 82 reads the image height data of each feature point at the time of the previous measurement from the memory unit 9 (Step S101). Subsequently, the calculation unit 82 acquires the temperature data from the temperature measuring unit 21 (Step S102). Then, the calculation unit 82 acquires the captured image, detects the position of each feature point in the captured image, and calculates the image height data (Step S103).

The calculation unit 82 compares the image height data of each feature point at the time of the previous measurement with the image height data of each feature point detected this time, calculates the difference between the image height data of the corresponding feature points, and determines whether or not there is a feature point whose difference is equal to or higher than a predetermined value (Step S104). If there is no feature point whose difference is equal to or higher than the predetermined value, the calculation unit 82 repeats processing of Step S104 for the next captured image in the same manner. Here, the next captured image may be a video of the next frame or a video after a predetermined number of frames.

If the feature point whose difference is equal to or higher than the predetermined value is determined, the calculation unit 82 reads the design value of the image height characteristics from the memory unit 9, generates correlation data such as the difference or the ratio between the design value of the image height characteristics and the image height characteristics detected from the captured image, and corrects distortion due to the change in the image height characteristics of the captured image based on the correlation data. Then, the calculation unit 82 stores the image height data and the temperature data measured this time in the memory unit 9 as "the image height data and the temperature data of the respective feature points at the time of the previous image correction" (Step S105).

Even after this, the calculation unit 82 acquires current temperature data from the temperature measuring unit 21 (Step S106), compares the present temperature data with the temperature data at the time of the previous image correction stored in the memory unit 9, and determines whether or not the difference is the predetermined value or more (Step S107). If the difference is not equal to or higher than the predetermined value, the temperature data is acquired again from the temperature measuring unit 21, and the comparison of the temperature data obtained with the temperature data at the time of the previous image correction is repeated.

Thus, if the change in temperature is large, the change in the image height characteristics of the lens is evaluated, and if there is a significant change in the image height characteristics, the distortion caused by the change in the image height characteristics of the captured image is corrected. In this manner, it is possible to suppress as much as possible that correction omission of distortion from occurring with respect to the change in temperature.

<Modification 2>

The camera housing 5 may be attached to the bracket 7 having the light shielding unit 6 such that a depression angle of the optical axis of the lens 2 may be changed by a motor drive. For example, by making the depression angle of the optical axis to an angle close to the horizontal, it is possible to capture a far away image, or by making it downward as much as possible, it is possible to capture an image in the vicinity of the vehicle or to capture an image close to the top-down view image. Thus, since the depression angle of the optical axis of the lens 2 is changed with respect to the bracket 7 having the light shielding unit 6 and a light shielding region by the light shielding unit 6 in the captured image is also changed, a range of the light shielding region after the change is detected, and optimal photometry used for adjustment of AE (automatic exposure compensation) and AWB (automatic white balance) may be automatically set or an optimum map for distortion correction of the image may be set based on the result.

<Modification 3>

A part or all of the image processing and the calculation by the image processing unit 8 as described above needs not necessarily be performed inside the vehicle-mounted camera apparatus 1. For example, they may be performed by a server connected via the Internet or another information processing apparatus in the vehicle. Thus, the vehicle-mounted camera apparatus 1 can be miniaturized and it is possible to reduce the cost.

[Supplementary Items]

Moreover, the present technology is not limited to the embodiments described above, and of course various modifications may be made thereto without departing from the scope of the present technology.

The present technology may also have the following structures.

(1) An vehicle-mounted camera apparatus, including:
a lens;
an image capture device unit that converts light imaged by the lens into an electrical signal to generate a captured image; and
a light shielding unit that shields a light ray corresponding to a part of an image capture region of the image capture device unit on an incident surface side of the lens.

(2) The vehicle-mounted camera apparatus according to (1), in which
the light shielding unit is arranged along the surface of the lens.

(3) The vehicle-mounted camera apparatus according to (1) or (2), further including:
an image processing unit that generates a first output image having a first resolution and a second output image having a second resolution smaller than that of the first output image from the captured image generated by the image capture device, in which
a region where the light ray is shielded by the light shielding unit is outside the region of the second output image.

(4) The vehicle-mounted camera apparatus according to any of (1) to (3), in which
the lens is a wide-angle lens.

(5) The vehicle-mounted camera apparatus according to (4), in which
the wide-angle lens has image height characteristics in which an image near an optical axis center is enlarged.

(6) The vehicle-mounted camera apparatus according to (5), in which
the image processing unit calculates the image height characteristics of the wide-angle lens based on edge information included in the image of the light shielding unit.

(7) The vehicle-mounted camera apparatus according to (6), in which
the image processing unit corrects distortion of the captured image based on the calculated image height characteristics of the wide-angle lens and a design value of the image height characteristics.

(8) The vehicle-mounted camera apparatus according to (7), in which
the image processing unit acquires temperature data, calculates the image height characteristics of the wide-angle lens when a difference between the temperature at the time of previous distortion correction is equal to or higher than a predetermined value, and corrects the distortion of the captured image based on the calculated image height characteristics of the wide-angle lens and the design value of the image height characteristics, when the difference between the image height characteristics at the time of the previous distortion correction is equal to or higher than a threshold value.

(9) The vehicle-mounted camera apparatus according to any of (1) to (8), further including:
an image output unit that outputs the first output image and the second output image generated by the image processing unit to one or more monitors.

(10) The vehicle-mounted camera apparatus according to any of (1) to (9), in which
the light shielding unit has a water droplet receiver.

(11) The vehicle-mounted camera apparatus according to any of (1) to (10), further including:
a camera housing for mounting the lens and the image capture device unit, in which
the light shielding unit is provided on the camera housing.

(12) The vehicle-mounted camera apparatus according to any of (1) to (11), further including:
a camera housing for mounting the lens and the image capture device unit; and
a bracket for fixing the camera housing to the vehicle, in which
the light shielding unit is provided on the bracket.

(13) The vehicle-mounted camera apparatus according to (12), in which
the camera housing is attached to the bracket such that a depression angle of the optical axis of the lens is changeable.

REFERENCE SIGNS LIST

1 vehicle-mounted camera apparatus
2 lens
3 image capture device
3*a* image capture region 4 substrate
5 camera housing
6 light shielding unit
7 bracket
8 image processing unit
9 memory unit
10 image output unit
11 low-brightness portion
21 temperature measuring unit
81 image conversion unit
82 calculation unit

The invention claimed is:

1. A vehicle-mounted camera apparatus, comprising:
a lens configured to image light, wherein the lens is a wide-angle lens;
an image capture device unit configured to convert the light imaged by the lens into an electrical signal to generate a captured image;
a light shielding unit on an incident surface side of the lens, wherein the light shielding unit is configured to shield a light ray corresponding to a part of an image capture region of the image capture device unit; and
an image processing unit configured to:
generate a first output image from the captured image, wherein the first output image has a first resolution;
generate a second output image having a second resolution, wherein
the second resolution is smaller than the first resolution, and
the second output image is generated from a first region where the light ray is shielded by the light shielding unit, wherein the first region is outside a second region of the second output image;
acquire first temperature data corresponding to a first distortion correction;
calculate an image height characteristics of the lens based on a difference between the first temperature data and second temperature data that is equal to or higher than a specific value, wherein
the second temperature data corresponds to a second distortion correction, and
the second distortion correction is previous to the first distortion correction; and
correct distortion of the captured image based on the calculated image height characteristics of the lens and a design value of the image height characteristics, wherein
the distortion of the captured image is corrected based on a difference between a first image height characteristics and a second image height characteristics that is equal to or higher than a threshold value, and
the first image height characteristics corresponds to a time of the first distortion correction and the second image height characteristics corresponds to a time of the second distortion correction.

2. The vehicle-mounted camera apparatus according to claim 1, wherein the light shielding unit is along the surface of the lens.

3. The vehicle-mounted camera apparatus according to claim 1, wherein
the wide-angle lens has the image height characteristics in which position of an image is at an optical axis center, and
the image is enlarged.

4. The vehicle-mounted camera apparatus according to claim 3, wherein the image processing unit is further configured to calculate the image height characteristics of the wide-angle lens based on edge information included in the image of the light shielding unit.

5. The vehicle-mounted camera apparatus according to claim 1, further comprising
an image output unit configured to output the first output image and the second output image generated by the image processing unit to at least one monitor.

6. The vehicle-mounted camera apparatus according to claim 1, wherein the light shielding unit has a water droplet receiver.

7. The vehicle-mounted camera apparatus according to claim 1, further comprising
a camera housing configured to mount each of the lens and the image capture device unit, wherein the light shielding unit is on the camera housing.

8. The vehicle-mounted camera apparatus according to claim 1, further comprising:
a camera housing configured to mount the lens and the image capture device unit; and
a bracket configured to fix the camera housing to a vehicle, wherein
the bracket is in contact with the light shielding unit,
the camera housing is attached to the bracket, and
a depression angle of an optical axis of the lens is changeable based on the attachment of the camera housing to the bracket.

9. An image distortion correction method, comprising:
imaging, by a lens, light, wherein the lens is a wide-angle lens;
converting, by an image capture device unit, the light imaged by the lens into an electrical signal;
generating, by the image capture device unit, a captured image based on the electrical signal;
shielding, by a light shielding unit, a light ray corresponding to a part of an image capture region of the image capture device unit;
generating, by an image processing unit, a first output image from the captured image, wherein the first output image has a first resolution;
generating, by the image processing unit, a second output image having a second resolution, wherein
the second resolution is smaller than the first resolution, and
the second output image is generated from a first region where the light ray shielded by the light shielding unit is outside a second region of the second output image;
acquiring, by the image processing unit, first temperature data corresponding to a first distortion correction;
calculating, by the image processing unit, an image height characteristics of the wide-angle lens based on a difference between the first temperature data and second temperature data that is equal to or higher than a specific value, wherein
the second temperature data corresponds to a second distortion correction, and
the second distortion correction is previous to the first distortion correction; and
correcting, by the image processing unit, distortion of the captured image based on the calculated image height characteristics of the wide-angle lens and a design value of the image height characteristics, wherein
the distortion of the captured image is corrected based on a difference between a first image height characteristics and a second image height characteristics that is equal to or higher than a threshold value, and the first image height characteristics corresponds to a time of the first distortion correction and the second image height characteristics corresponds to a time of the second distortion correction.

* * * * *